(12) United States Patent
Ungar

(10) Patent No.: US 7,438,555 B2
(45) Date of Patent: Oct. 21, 2008

(54) TEACHING AID

(75) Inventor: Stephen Ungar, Victoria (AU)

(73) Assignee: Hinkler Books Pty. Ltd., Dingley, Victoria (AU)

( * ) Notice: Subject to any disclaimer, the term of this patent is extended or adjusted under 35 U.S.C. 154(b) by 344 days.

(21) Appl. No.: 11/245,329

(22) Filed: Oct. 5, 2005

(65) Prior Publication Data

US 2006/0078865 A1    Apr. 13, 2006

(51) Int. Cl.
*G09B 3/02*    (2006.01)

(52) U.S. Cl. .................................. 434/176; 434/348

(58) Field of Classification Search ............... 434/157, 434/161, 176, 199, 327, 331, 333, 348; 283/72, 283/94, 98, 99; 292/293, 299–302, 308
See application file for complete search history.

(56) References Cited

U.S. PATENT DOCUMENTS

| | | | | |
|---|---|---|---|---|
| 1,538,530 A * | 5/1925 | Troidl | .................... | 434/176 |
| 1,816,760 A * | 7/1931 | Barnowitz | .................... | 434/349 |
| 2,503,130 A * | 4/1950 | Poritz | .................... | 434/349 |
| 3,055,118 A * | 9/1962 | Betancourt | .................... | 434/348 |
| 3,174,231 A * | 3/1965 | Schure | .................... | 434/331 |
| 3,206,872 A * | 9/1965 | Nason et al. | .................... | 434/348 |
| 3,387,390 A * | 6/1968 | Chuy et al. | .................... | 434/331 |
| 3,874,096 A * | 4/1975 | Romstad | .................... | 434/199 |
| 4,770,638 A * | 9/1988 | Jabour et al. | .................... | 434/348 |
| 5,277,587 A * | 1/1994 | Aiken et al. | .................... | 434/333 |
| 5,281,146 A * | 1/1994 | Janney | .................... | 434/348 |
| 5,409,381 A * | 4/1995 | Sundberg et al. | .................... | 434/159 |
| 5,797,601 A * | 8/1998 | Ritchie | .................... | 273/431 |
| 5,951,298 A * | 9/1999 | Werzberger | .................... | 434/178 |
| 6,053,741 A * | 4/2000 | Wood | .................... | 434/348 |
| 6,652,286 B1 * | 11/2003 | Larsen | .................... | 434/348 |
| 2004/0197760 A1 * | 10/2004 | Rawlins et al. | .................... | 434/327 |

* cited by examiner

*Primary Examiner*—Kurt Fernstrom
(74) *Attorney, Agent, or Firm*—Smith-Hill and Bedell

(57) ABSTRACT

A hand held teaching aid is made of three layers of card. The grip has a panel projecting from the grip and a pocket slides on the panel. The grip carries a picture of an item whose name is to be taught, eg. an apple, and the panel bears the name of the item, eg. APPLE. When the grip and pocket are pushed together, the picture is visible but not the word. When the grip and pocket are slid apart, the word comes into view. In a variant, numerals and simple calculations replace pictures and words.

7 Claims, 2 Drawing Sheets

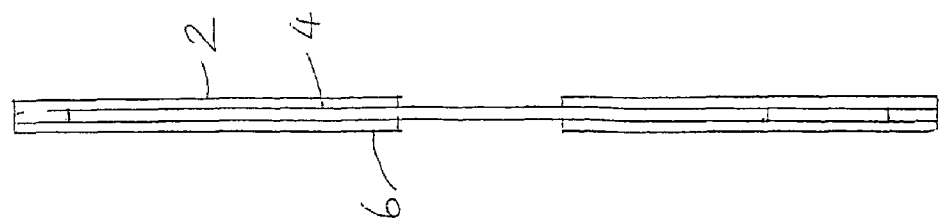
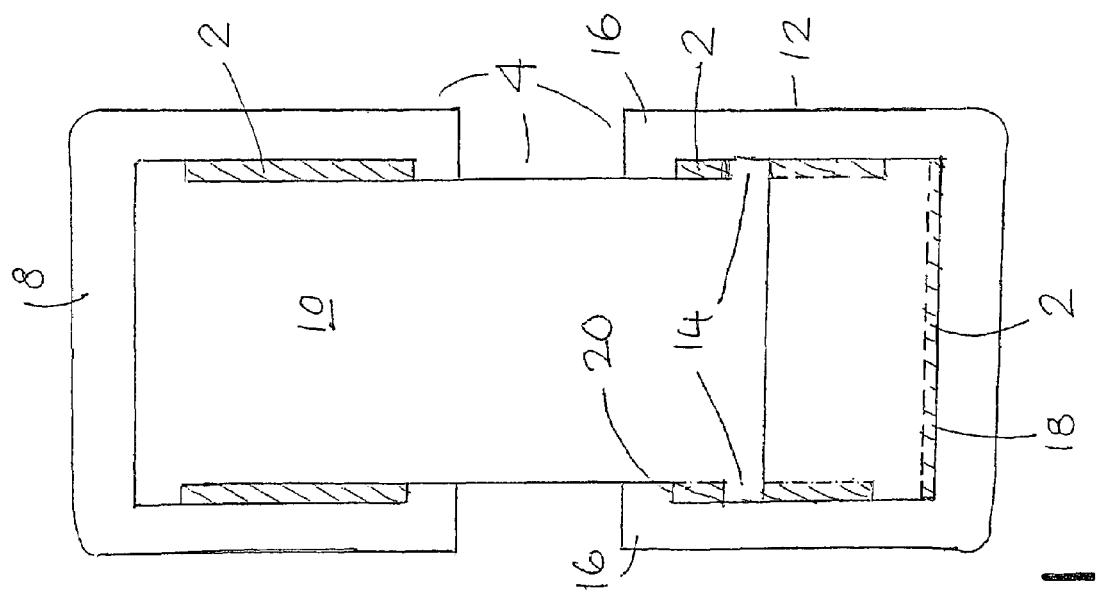
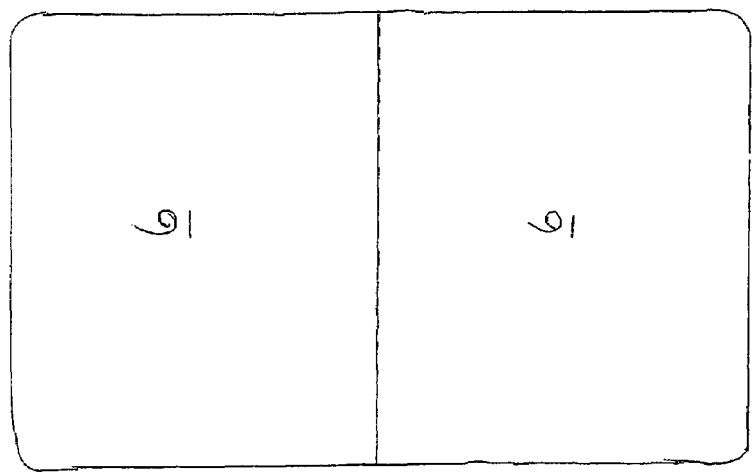

TEACHING AID

FIELD OF THE INVENTION

This invention concerns teaching aids and especially devices for manual use in kindergartens and prep schools.

SUMMARY OF THE INVENTION

The apparatus aspect of this invention provides a teaching aid having a surface on which a problem is presented to the viewer and a surface on which a solution is presented, wherein the solution is obscured until the surfaces move in relation to each other in order to reveal the solution to the viewer.

The surfaces are preferably superimposed and the problem hides the solution. The problem may be identified on a pocket and the solution may appear on a part which is inserted into and retracted from the pocket. The aid may be made from layers of paperboard, plastic sheet or plywood.

The aid preferably comprises a stationary grip, a panel extending from the grip and a pocket which slides on the grip. The panel may be symmetrical in outline and the grip and pocket cut as identical blanks. This is not an essential feature as the grip and panel may be made as a unitary component, but it simplifies production if the panel is I-shaped and symmetrical and the grip and pocket blanks look identical in shape.

BRIEF DESCRIPTION OF THE DRAWINGS

One embodiment of the invention is now described by way of illustration with reference to the accompanying drawings, in which:

FIG. 1 is a plan of the aid with the top layer removed to show the internal construction.

FIG. 2 is a side view of the aid shown in FIG. 1.

DETAILED DESCRIPTION WITH RESPECT TO THE DRAWINGS

Figure 4:
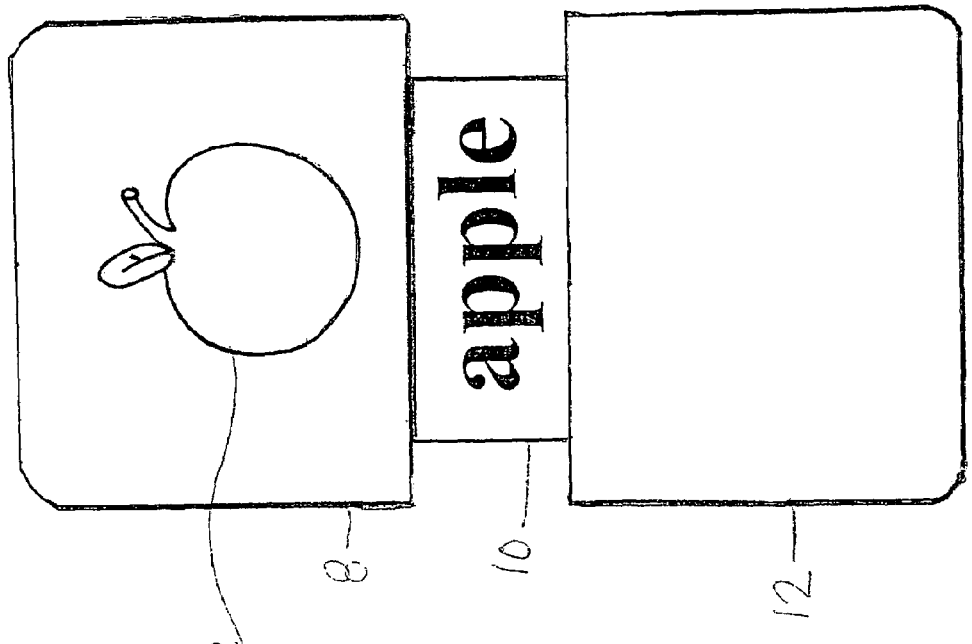
FIG. 4 is a plan of the aid in the reveal mode.

Referring now to FIGS. 1 and 2, the aid is laminated from three paperboard layers, namely a base layer 2, a mid layer 4 and a top layer 6. The aid consists of a grip 8, an I-shaped panel 10 extending from the grip 8 and a pocket 12 within which the I-shaped panel slides. The three layers of the grip and the panel are glued together as a one piece unit. The pocket 12 is the same area as the grip but its three layers allow the panel to slide in and out of the pocket in controlled rectilinear motion. The slide motion is made possible by making the mid layer of the pocket substantially U-shaped and making the projections 14 on the leading end of the panel, the same width as the projection 16 on the pocket. The panel is accordingly guided at two sites. The edge 18 acts as an insertion stop whereas the two mutually obstructing surfaces 20 act as a withdrawal stop. The broken line indicates the panel position when the grip and pocket close together. The top layer 6 is glued to the mid layer 4 imprisoning the panel 10 within the pocket 12. Thus the parts cannot separate and become lost.

Figure 3:
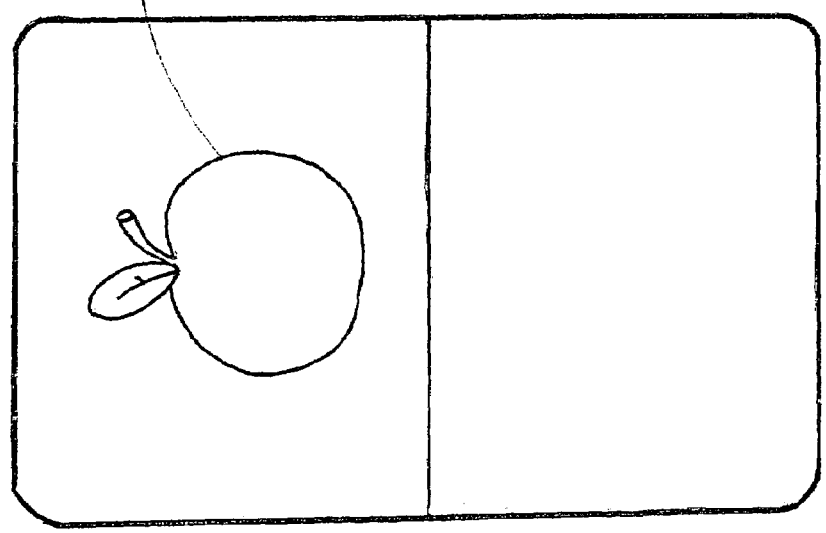
FIG. 3 is a plan of the aid in the present mode.

Referring now to FIGS. 3 and 4, the front face of the grip 8 is printed with a picture of an apple 22. The front surface of the panel is printed with the word "apple". The user holds the pocket showing the apple picture to the learner and asks the learner the name of the displayed object, namely the apple. When the learner replies, the user slides out the panel revealing the "apple" answer.

In other non-illustrated embodiments, the subjects for recognition vary, for example the grip shows 6+4=while the panel shows 10.

In a variant, the aid is not flat but cuboid presenting four faces for teaching grouped subject matter.

We have found the advantages of the above embodiment to be:

1. A series of flat aids fit face to face in a stacking box.
2. Children enjoy the anticipation of the solution which may appear step wise one letter at a time to encourage spelling.
3. Hard to learn items can be grouped for repeat more easily than if the items were in book form.

What is claimed is:

1. A teaching aid comprising:
    a panel having an indicia bearing surface which presents a solution to an intellectual problem to a viewer,
    a first part cooperating with the panel and having an indicia bearing surface which presents the problem to the viewer, and
    a second part cooperating with the panel,
    wherein one of the first and second parts cooperates with the panel as a grip from which the panel extends, the other of the first and second parts cooperates with the panel as a pocket slidable on the panel, and the indicia bearing surfaces are superimposable in order to obscure the solution from the viewer until the pocket slides from a position adjacent the grip to a position where the solution is revealed to the viewer.

2. A teaching aid as claimed in claim 1, wherein the panel and pocket have mutually obstructing parts which act as stops to limit the retraction of the pocket.

3. A teaching aid as claimed in claim 2, wherein the panel is I-shaped and the pocket is substantially U-shaped internally preventing separation of the pocket from the panel.

4. A teaching aid as claimed in claim 1, wherein the aid is made from three layers, the middle layer comprising the panel having a grip end and a pocket end, each end being surrounded by a substantially U-shaped spacer all lying in a common plane, a top outer layer superimposed on the panel and spacers and a bottom outer layer likewise superimposed on the panel and spacers serving to imprison the grip end and pocket end of the panel while allowing the panel to slide in the pocket.

5. A teaching aid as claimed in claim 1, wherein the grip and pocket are of equal area.

6. A teaching aid as claimed in claim 1, wherein the aid is made from layers of paperboard, plastic sheet or plywood.

7. A teaching aid as claimed in claim 1, wherein the first part cooperates with the panel as the grip and the second part cooperates with the panel as the pocket.

* * * * *